(12) United States Patent
Christie, IV

(10) Patent No.: US 7,254,832 B1
(45) Date of Patent: Aug. 7, 2007

(54) FIREWALL CONTROL FOR SECURE PRIVATE NETWORKS WITH PUBLIC VOIP ACCESS

(75) Inventor: Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 912 days.

(21) Appl. No.: 09/650,120

(22) Filed: Aug. 28, 2000

(51) Int. Cl.
*G06F 9/00* (2006.01)
*G06F 15/16* (2006.01)
*G06F 17/00* (2006.01)

(52) U.S. Cl. ............... 726/11; 726/12; 726/13; 726/14

(58) Field of Classification Search .......... 709/230, 709/225, 223, 277; 713/201; 370/352
See application file for complete search history.

(56) References Cited

U.S. PATENT DOCUMENTS

| | | | |
|---|---|---|---|
| 5,778,174 A * | 7/1998 | Cain .................... | 713/201 |
| 6,219,706 B1 * | 4/2001 | Fan et al. ............... | 709/225 |
| 6,466,981 B1 * | 10/2002 | Levy ..................... | 709/227 |
| 6,550,012 B1 * | 4/2003 | Villa et al. ............. | 713/201 |
| 6,611,864 B2 * | 8/2003 | Putzolu et al. ........ | 709/223 |
| 6,614,781 B1 * | 9/2003 | Elliott et al. .......... | 370/352 |
| 6,631,416 B2 * | 10/2003 | Bendinelli et al. ..... | 709/227 |
| 6,751,677 B1 * | 6/2004 | Ilnicki et al. .......... | 719/316 |
| 2001/0009014 A1 | 7/2001 | Savage, III et al. | |
| 2001/0021186 A1 | 9/2001 | Ono et al. | |
| 2001/0024436 A1 | 9/2001 | Barraclough et al. | |
| 2001/0026548 A1 | 10/2001 | Strathmeyer et al. | |
| 2001/0038624 A1 | 11/2001 | Greenberg et al. | |
| 2002/0120760 A1 * | 8/2002 | Kimchi et al. ......... | 709/230 |

OTHER PUBLICATIONS

Durham et al., "the COPS (Common Open Policy Services) protocol", Jan. 2000, RFC 2748, pp. 1-38.*
Rosenberg J. et al, "Getting SIP Through Firewalls and NATs" Internet draft, SIP WG, Feb. 22, 2000.
Thernelius F. et al, "SIP Firewall Solution" Internet draft, SIP WG, Jul. 2000.
European Search Report for EP 01 96 8181, mailed Dec. 21, 2004.

* cited by examiner

*Primary Examiner*—Taghi Arani
*Assistant Examiner*—Arezoo Sherkat
(74) *Attorney, Agent, or Firm*—Withrow & Terranova, PLLC

(57) ABSTRACT

A private network firewall 225 is treated as if it were a media gateway network entity. Doing so allows a media gateway controller 205 to exchange messages with the firewall 225 for purposes of securely setting up and tearing down pinholes in the firewall. With this ability comes the ability to provide secure VoIP calls between public 250 and private 220 networks. A call server or media gateway controller 205, that is approving the VoIP communication stream in a private packet data network requests, via a secure tunnel 230, that the firewall 225 open a pinhole filter for a specific source and destination address pair corresponding to media gateway endpoints, 210 and 260 respectively, using either MGCP (H.248) or COPS messages, for instance. The pinhole filter is then disabled when the session is complete.

29 Claims, 3 Drawing Sheets

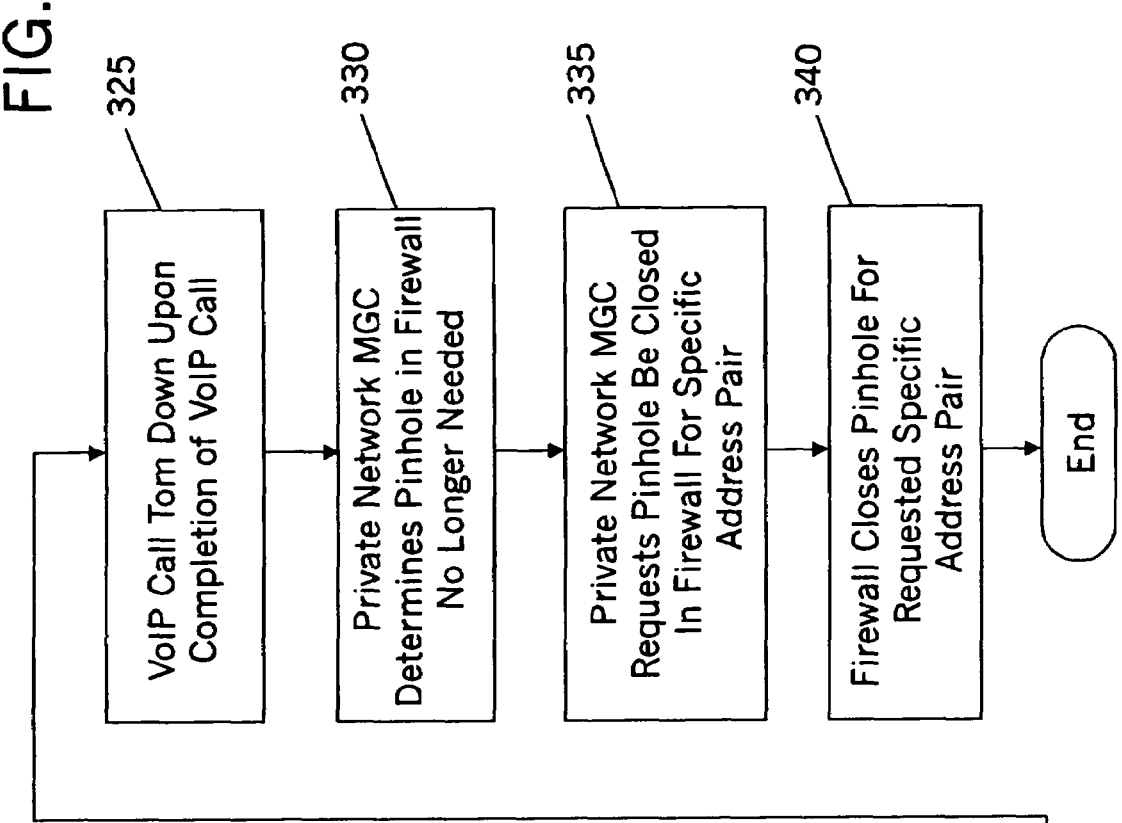
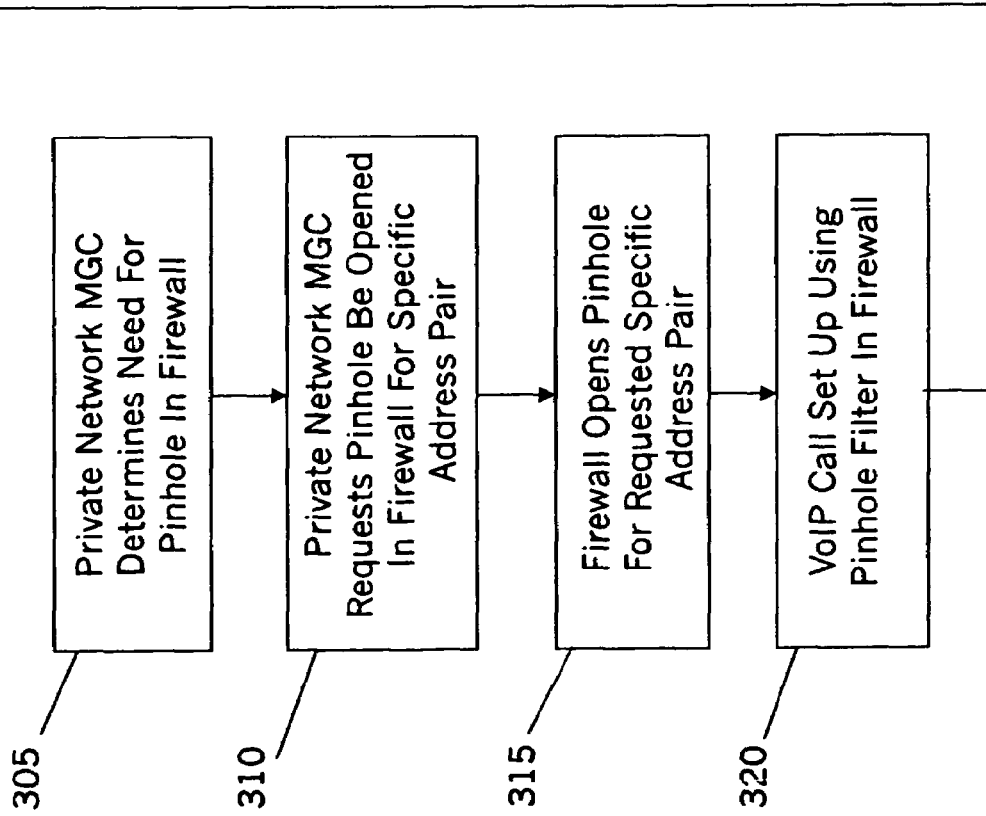
FIG. 3

FIREWALL CONTROL FOR SECURE PRIVATE NETWORKS WITH PUBLIC VOIP ACCESS

FIELD OF THE INVENTION

The present invention relates generally to securely managing a pinhole opening in a firewall that protects a private network, the pinhole for use in communicating via Voice-over IP telephony.

BACKGROUND OF THE INVENTION

In the architecture defined by the Media Gateway Control (MEGACO) IETF Working Group, a typical H.248 model comprises media gateways (MGs) focusing on media translation and media gateway controllers (MGCs) focusing on call signaling and call processing functions.

Voice-over IP (VoIP) calls, sometimes referred to as Internet telephony, utilize a call signaling path between media gateway controllers, a media gateway control path between media gateway controllers and media gateways, and a bearer path. The call signaling path transfers call control data necessary to setup, connect and process a call. The media gateway control path is used by the media gateway controller to exchange data with the media gateways under its control. The bearer path is the actual voice data connection over which a conversation may take place. A media gateway port may have only one associated media gateway controller.

Private networks are generally protected from intrusion from public networks such as the Internet by firewalls that only permit certain pre-approved packet streams through pinhole openings in the firewall. A pinhole opening in a firewall may also be referred to as a packet filter. Data packets are routed (or denied routing) based on, among other things, the source and destination address in the packet header including the port number. The packet filter works like a mask, allowing only data that meets specific criteria to pass. The specific criteria are a set of rules where each data packet is subjected to the set of rules. The firewall performs state-full inspection and subjects data packet content as well as data packet header information to the filtering rules that define the pinhole openings in the firewall.

Typically a firewall is directly controlled by a system administrator or the like through a pre-defined set of approved address pairs. Dynamic firewall control on a per call basis is desired for secure VoIP telephony between endpoints on either side of a firewall. Unfortunately, the present firewall control scheme does not permit remote dynamic control of a firewall from another private network entity.

Given the nature of the security risk and the design of VoIP systems, firewalls must be dynamically modified on a per call basis in order to avoid security breaches. Either the firewall must comprehend the call signaling protocol and derive the pinhole requirements, or an external device that understands the call signaling protocol must explicitly inform the firewall.

Firewalls have been interpreting known protocols and learning of pinhole requirements for some time. Doing so, however, implies continuous network infrastructure upgrades as new protocols are introduced. Continuously upgrading network infrastructures increases the cost of and reduces the velocity of new service deployments. Alternatively, protocol specific "proxies" have been built which understand specific protocols and are, in effect, a widening of the firewall—an alternate path into the secure private network for a specific protocol suite. Unfortunately, these implementations possess performance characteristics that cannot meet the requirements of VoIP media streams.

What is needed is a way to dynamically manage a pinhole in a private network firewall such that VoIP communication between endpoints on the private network and endpoints on a network beyond the firewall do not compromise the security of the private network.

SUMMARY OF THE INVENTION

In essence, the present invention treats a private network firewall as if it were a media gateway network entity. Doing so allows media gateway controllers to exchange messages with the firewall for purposes of securely setting up and tearing down pinholes in the firewall. Thus, a firewall can be remotely managed from another network entity broadly termed a firewall controller which may be, for instance, a media gateway controller call server. With this ability comes the ability to provide secure VoIP calls between public and private networks.

A call server that is approving the VoIP communication stream (e.g., a media gateway controller) requests, via a secure tunnel, that the firewall open a pinhole filter for a specific source and destination address pair. The pinhole filter is then disabled when the session is complete. The pinhole open and pinhole close requests are made using either an MGCP (H.248) or COPS message pair.

According to one embodiment of the invention is a method of remotely controlling a firewall from a firewall controller in order to permit the flow of packet data through the firewall. The firewall controller can be a call server in a VoIP telephony system such as a media gateway controller. The method includes having the firewall controller determine the need for a pinhole in the firewall. This occurs when a media gateway endpoint on the secure side of the firewall either wishes to place a call to an endpoint outside the firewall or receive a call from an endpoint outside the firewall. Both of these events are made known to the media gateway endpoint's call server. The firewall controller sends a request to the firewall requesting that a pinhole be opened for a specific address pair corresponding to the respective media gateway endpoints involved in the call. The firewall carries out the request and opens a pinhole. Upon termination of the call, the firewall controller determines that the pinhole is no longer needed and sends a request to the firewall to close the pinhole. The firewall then closes the pinhole.

Other aspects and features of the present invention will become apparent to those ordinarily skilled in the art upon review of the following description of specific embodiments of the invention in conjunction with the accompanying figures.

BRIEF DESCRIPTION OF THE FIGURES

FIG. 3 is a flowchart illustrating the logic among the network entities illustrated in FIG. 2.

DETAILED DISCLOSURE OF THE INVENTION

Figure 1:
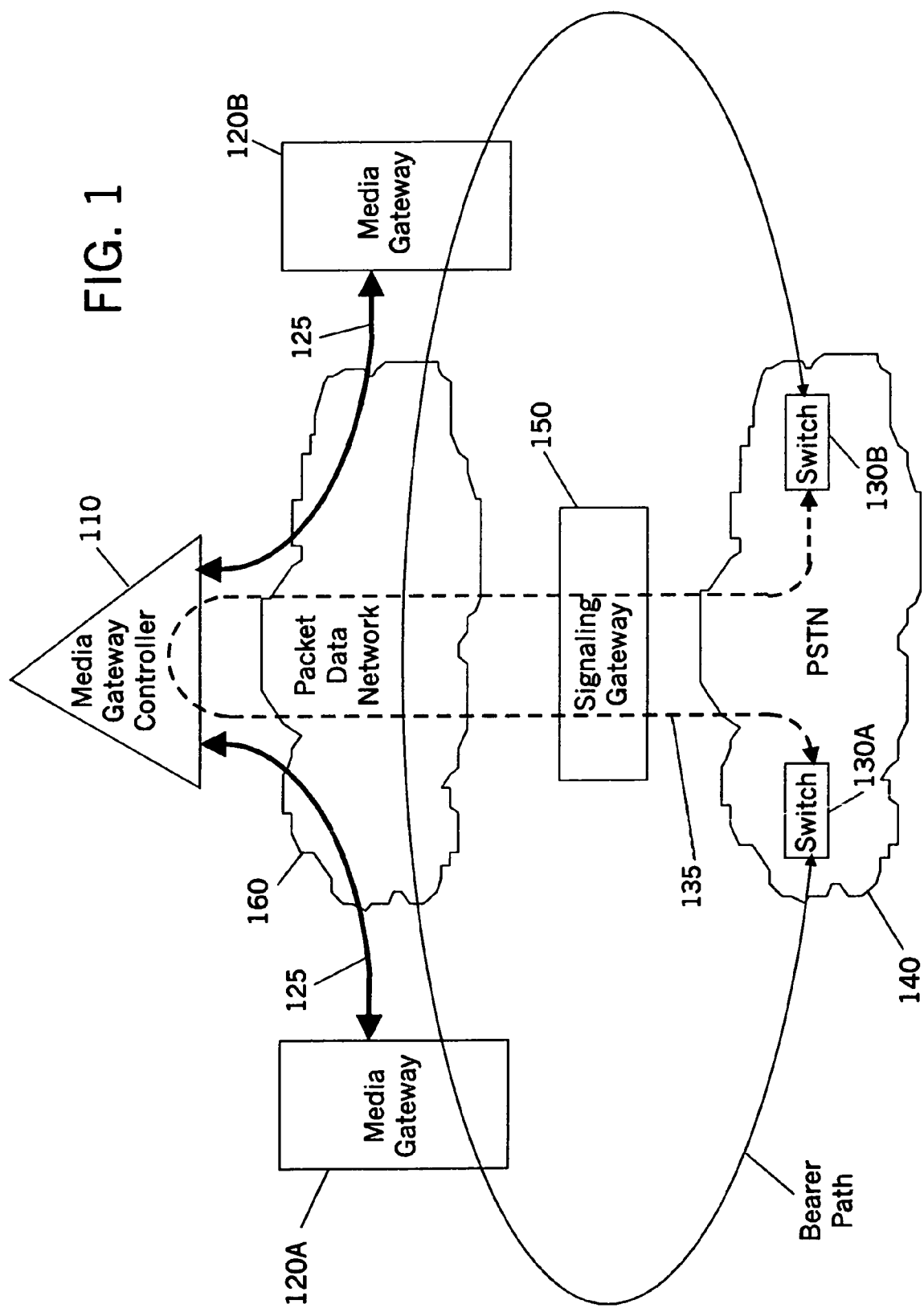
FIG. 1 is a typical network embodiment of a Media Gateway Control (MEGACO) architecture illustrating a packet data network call.

One aspect of the H.248 Protocol is to control media gateways (MGs) for data packet networks utilizing call control elements and intelligence external to the media gateways. The external call control elements are generally referred to as media gateway controllers (MGCs). This includes, but is not limited to, voice over IP (VoIP), Voice-over ATM (VOATM) media gateways, and Voice-over any general packet data network.

A media gateway (MG) in a packet telephony system is a network element that provides conversion between the audio signals carried on standard switched circuit networks and data packets carried over the Internet or other packet data networks. H.248 assumes that the media gateway controllers will coordinate among themselves to send coherent commands to the media gateways under their control. As such, H.248 does not define a mechanism for coordinating media gateway controllers. H.248 is, in essence, a master/slave protocol, where the media gateways are expected to execute commands sent by the media gateway controllers and report events for use by the media gateway controller. H.248 further assumes a connection model where the basic constructs are endpoints and connections. Endpoints are sources or sinks of data and may be physical or virtual.

One example of a physical endpoint is an interface on a media gateway that terminates a trunk connected to a PSTN switch (e.g., Class 5, Class 4, etc.). A media gateway that terminates trunks is called a trunk gateway. Another example of a physical endpoint is an interface on a media gateway that terminates an analog POTS (Plain Old Telephone Service) connection to a phone, key system, PBX, etc. A media gateway that terminates residential POTS lines (to phones) is called a residential POTS gateway or a loop access gateway. An example of a virtual endpoint is an audio source in an audio-content server. Creation of physical endpoints entails hardware installation, while creation of virtual endpoints can be done by software.

H.248 is designed as an internal protocol within a distributed system that appears to the outside as a single media gateway. The model is composed of a media gateway controller, that may or may not be distributed over several computer platforms, and of a set of media gateways. In a typical configuration, the distributed gateway system will interface on one side with one or more telephony (i.e. circuit) switches, and on the other side with H.323 or SIP conformant systems.

In the H.248 model, the media gateways focus on the audio signal translation function, while the media gateway controllers handle the call signaling and call processing functions. As a result, the media gateway controller implements the "signaling" layers of the H.323 standard, and presents itself as an "H.323 Gatekeeper" or as one or more "H.323 Endpoints" to the H.323 systems.

H.248 assumes a connection model where the basic constructs are endpoints and connections. Connections are grouped in calls. One or more connections can belong to one call. Connections and calls are set up at the initiative of one or several media gateway controllers in which each media gateway controller operates on the data received from the previous media gateway controller in a serial fashion.

Connections may be either point-to-point or multi-point. A point-to-point connection is an association between two endpoints with the purpose of transmitting data between these endpoints. Once this association is established for both endpoints, data transfer between these endpoints can take place. A multi-point connection is established by connecting the endpoint to a multi-point session.

Connections can be established over several types of bearer path networks including transmission of audio packets using RTP and UDP over an IP network; transmission of audio packets using AAL2, or another adaptation layer, over an ATM network; and transmission of packets over an internal connection, for example the TDM backplane or the inter-connection bus of a gateway (this is used, in particular, for "hairpin" connections, connections that terminate in a gateway but are immediately re-routed over the telephone network).

Yet another example of an endpoint can be a firewall. A firewall is a construct within a private network that is typically used to separate a public access network from the private network. The firewall serves to protect the private network from unauthorized access while permitting specific data transfers (e.g., VoIP calls) between the public network and private network. Thus, a firewall can be made to respond to a media gateway controller by treating it as a physical endpoint. As such, it can receive and execute instructions or commands from a media gateway controller.

FIG. 1 illustrates a typical Media Gateway Control (MEGACO) network architecture in which a single media gateway controller 110 is utilized to control a call between a pair of media gateways 120A, 120B. In this example, the calling endpoints are switches 130A, 130B within the public switching telephone network (PSTN) 140. The switches 130A, 130B are connected to actual telephones which are not shown. A call signaling path (shown as a dotted line) is responsible for transferring call control data necessary to setup, connect and process a call. The call signaling path runs from one endpoint (switch 130A) within the PSTN 140 into a signaling gateway 150 linked to a packet data network 160 (e.g., the Internet) into media gateway controller 110 and then back down to the other endpoint (switch 130B) via packet data network 160 and signaling gateway 150 to the PSTN 140.

The bearer path is the actual voice/data connection over which a conversation may take place. It also runs from PSTN switch endpoint 130A to PSTN switch endpoint 130B. However, its route is different from the call signaling path. The bearer path leaves PSTN switch endpoint 130A and enters a media gateway 120A linked to packet data network 160 which is linked to a second media gateway 120B. Media gateway 120B then relays the bearer path to PSTN switch endpoint 130B.

Media gateway controller 110 controls media gateways 120A, 120B. To do so, however, requires a media gateway control protocol link 125 between media gateway controller 110 and each media gateway 120A, 120B.

Thus, media gateway controller 110 has bearer path access through a media gateway 120A, 120B via the media gateway control protocol link 125. Bearer path access is needed in order to detect specific events. Once a specific event is detected, media gateway controller 110 can issue call control commands or instructions to each endpoint 130A, 130B via the call signaling path 135.

Figure 2:
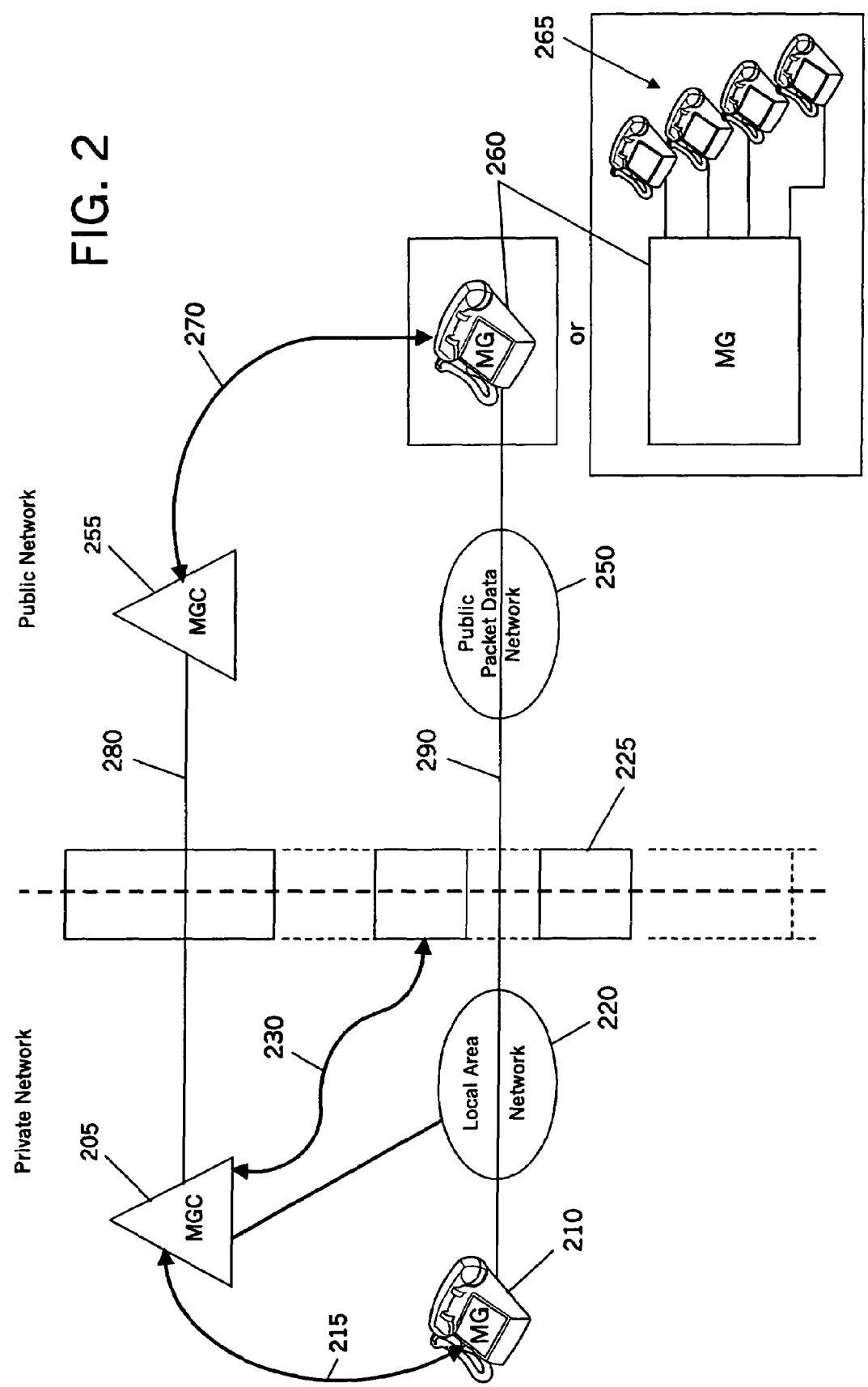
FIG. 2 is one network embodiment of an architecture illustrating a packet data network call between a private network and a public network that are separated by a firewall.

FIG. 2 is an extension of FIG. 1 in that a firewall is added to the network architecture. The firewall is treated similar to a media gateway in that it can receive and follow commands from a media gateway controller.

On the private network side there is a media gateway controller 205 that can function as an IP PBX Call Server. Media gateway controller 205 is operatively connected to at least one media gateway endpoint 210 which can be an IP telephony device or a computer having IP telephony capability. The connection between media gateway controller 205 and media gateway endpoint 210 is via a media gateway control path 215. Media gateway controller 205 is also a node on a Local Area Network (LAN) 220. Media gateway controller 205 is also operatively connected to a firewall 225 via a firewall control path 230.

The public network side of the architecture shown in FIG. 2 is included for descriptive purposes. The present invention centers mainly on the signaling among media gateway controller 205 and its physical endpoints, specifically firewall 225. The public network side includes a packet data network 250 such as the Internet, a second media gateway controller 255 acting as a central Office IP Call Server that serves other media gateway endpoints 260, 265 via media gateway control path(s) 270.

Private side media gateway controller 205 and public side media gateway controller 255 communicate directly with one another over a call signaling path 280 potentially via an optional secure tunnel such as an IPSec session pre-authorized through the firewall.

Media gateway controller 205 is the entity responsible for approving communication stream requests emanating from or terminating to media gateway endpoint(s) 210 within the private network. When a media gateway endpoint 210 wants to place a call, it initially reports an offhook event to media gateway controller 205. Next the user keys in the number on the media gateway endpoint 210 he or she wishes to connect to. If the number is representative of another internal media gateway endpoint then media gateway controller 205 which is functioning as the IP PBX call server need not involve firewall 225. Otherwise, if the number is representative of a media gateway endpoint 260 outside the private network, then media gateway controller 205 realizes the need to create a pinhole in firewall 225 before it can approve the communication stream. Media gateway controller 205, which is within the private network, communicates with media gateway controller 255 via call signaling path 280 in order to define the destination media gateway on the public network.

Similarly, if a call is incoming to a private side media gateway 210, private side media gateway controller 205 is contacted first by public network media gateway controller 255. The media gateway controllers 205, 255 exchange call signaling information regarding media gateway endpoints 210, 260.

At this point, media gateway controller 205 sends a request message to firewall 225 over a control path 230 requesting that firewall 225 open a pinhole to allow communication over bearer path 290. Communication will be between the network address pair corresponding to media gateway endpoints 210 and 260 in the private network and public network respectively. These endpoints were previously defined in an exchange between media gateway controllers 205 and 255.

Message exchanges between media gateway controller 205 and firewall 225 can be achieved using either the H.248 control protocol or the Common Open Policy Services (COPS) protocol. If H.248 is implemented then the firewall would need to be augmented to handle H.248 messaging such as for instance, an open connection request. The IP PBX call server (media gateway controller 205) would have to consider the firewall each time a call is made to or received from a media gateway endpoint outside the private network. If COPS is implemented then the IP PBX call server (media gateway controller 205) would be enhanced to support COPS policy messages received from firewall 225.

The messages that need to be exchanged between media gateway controller 205 and firewall 225 relate to the creation and destruction of pinholes.

Once the firewall receives a request message to create a pinhole it executes the request and acknowledges the creation of the pinhole back to media gateway controller 205. Now media gateway controller 205 can continue with normal establishment of the call between the media gateway endpoints in the private network and public network. When the call is terminated by one or both parties, media gateway controller 205 detects the termination via well known call signaling techniques and sends a request message to firewall 225 requesting that the pinhole be closed as there is no longer a need for it. Firewall 225 immediately closes the pinhole securing the private network.

FIG. 3 is a flowchart illustrating the logic among the network entities illustrated in FIG. 2. Initially, the private network media gateway controller determines the need for a pinhole in the firewall 305. This determination is the result of direct call signaling between media gateway controllers in the private and public network. Each media gateway controller controls at least one media gateway endpoint.

When a media gateway endpoint in one network wishes to communicate with (i.e., place a VoIP call to) a media gateway endpoint in another network, their respective media gateway controllers exchange call signaling messages for the purpose of setting up and managing the call between the endpoints. The private network media gateway controller will either receive a request from one of its media gateway endpoints to communicate with another endpoint, or the private network media gateway controller will receive a request from another media gateway controller informing the private media gateway controller that a remote media gateway endpoint wishes to communicate with one of the private network media gateway controller's media gateway endpoints.

When either request is received, the private network media gateway controller first determines whether the source and destination endpoints are both within the private network. If they are, then the firewall need not be involved in setting up the call. If, however, one of the endpoints (either the source or destination) is outside the private network firewall, the private network media gateway controller realizes the need for a pinhole opening in the firewall and requests that a pinhole be opened for a specific source/destination address pair 310. Upon receiving the request the firewall opens the pinhole for the specific address pair 315. At this point, the private network media gateway controller sets up the call 320 using the pinhole filter just established. The source and destination media gateway endpoints may now communicate via VoIP. The private network is still protected by the firewall since a dynamic pinhole has been approved for this specific call only. Upon termination of the call, the connection is torn down between the endpoints 325. At the same time, the private network media gateway controller realizes that the pinhole filter is no longer required 330 and requests that the firewall close the pinhole 335. The firewall then closes the pinhole filter 340.

Media gateway controller 205 can be replaced by an apparatus generically termed a firewall controller. Such an apparatus would be able to remotely command a firewall 225 using COPS or H.248 for the purpose of determining when a pinhole is needed, creating a pinhole, determining when a pinhole is no longer needed, and closing pinhole. This device is not necessarily limited to managing and approving communication stream requests for a VoIP telephony application. It can be used to approve and manage data exchanges of all types between network address pairs in private and public networks.

One of the advantages of the present invention provides is a decoupling of the firewall from a pinhole implementation. Thus, a new controller having a secure relationship with the firewall can be added to the firewall as opposed to augmenting an existing controller. As a result deployment is a much simpler and less time consuming task.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart illustration(s). It will be understood that each block of the flowchart illustration(s), and combinations of blocks in the flowchart illustration(s), can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s), and combinations of blocks in flowchart illustration(s) can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method of remotely controlling a firewall from a firewall controller in order to permit the flow of packet data through said firewall, the method comprising:
   sending a request message from a firewall controller to a firewall requesting that a pinhole be opened;
   opening a pinhole in said firewall;
   sending a request message from a firewall controller to said firewall requesting that a pinhole be closed; and
   closing said pinhole.

2. The method of claim 1 further comprising:
   determining the need for a pinhole in said firewall.

3. The method of claim 2 wherein said step of determining occurs at said firewall controller.

4. The method of claim 3 wherein said firewall controller is a media gateway controller.

5. The method of claim 1 further including the step of determining the need for a pinhole prior to sending a request that a pinhole be opened.

6. The method of claim 1 wherein said request messages are formatted in the H.248 protocol.

7. The method of claim 1 wherein said request messages are formatted in the common open policy services (COPS) protocol.

8. A firewall controller for permitting the flow of packet data, said firewall controller comprising:
   means for determining a need for a pinhole in a firewall;
   means for sending a request message to said firewall requesting that a pinhole be opened in said firewall; and
   means for sending a request message to said firewall requesting that said pinhole be closed in said firewall.

9. The firewall controller of claim 8 wherein said request messages are formatted in the H.248 protocol.

10. The firewall controller of claim 8 wherein said request messages are formatted in the common open policy services (COPS) protocol.

11. The firewall controller of claim 8 wherein said firewall controller is a media gateway controller.

12. A firewall responsive to a firewall controller for permitting the flow of packet data, said firewall comprising:
   means for receiving a request message from said firewall controller requesting that a pinhole be opened in said firewall;
   means for opening a pinhole in said firewall;
   means for receiving a request message from said firewall controller requesting that said pinhole be closed in said firewall; and
   means for closing said pinhole in said firewall.

13. The firewall of claim 12 wherein said request messages are formatted in the H.248 protocol.

14. The firewall of claim 12 wherein said request messages are formatted in the common open policy services (COPS) protocol.

15. A firewall responsive to a media gateway controller for permitting the flow of packet data, said firewall comprising:
   means for receiving a request message from said media gateway controller requesting that a pinhole be opened in said firewall;

means for opening a pinhole in said firewall;
means for receiving a request message from said media gateway controller requesting that said pinhole be closed in said firewall; and
means for closing said pinhole in said firewall.

16. A computer program product for remotely controlling a firewall from a firewall controller in order to permit the flow of packet data through said firewall, the computer program product having a medium with a computer program embodied thereon, the computer program product comprising:
computer program code in said firewall controller for sending a request message to said firewall requesting that a pinhole be opened; and
computer program code in said firewall for opening a pinhole;
computer program code in said firewall controller for sending a request message to said firewall requesting that said pinhole be closed; and
computer program code for in said firewall for closing said pin hole.

17. The computer program product of claim 16 further comprising:
computer program code in said firewall controller for determining the need for a pinhole in said firewall.

18. The computer program product of claim 16 wherein said request messages are formatted in the H.248 protocol.

19. The computer program product of claim 16 wherein said request messages are formatted in the common open policy services (COPS) protocol.

20. The computer program product of claim 17 wherein said firewall controller is a media gateway controller.

21. A computer program product in a firewall controller, said firewall controller operative with a firewall, the computer program product having a medium with a computer program embodied thereon, the computer program product comprising:
computer program code for determining the need for a pinhole in said firewall;
computer program code for sending a request message to said firewall requesting that a pinhole be opened in said firewall; and
computer program code for sending a request message to said firewall requesting that said pinhole be closed in said firewall.

22. The computer program product of claim 21 wherein said request messages are formatted in the H.248 protocol.

23. The computer program product of claim 21 wherein said request messages are formatted in the common open policy services (COPS) protocol.

24. The computer program product of claim 21 wherein said firewall controller is a media gateway controller.

25. A computer program product in a firewall, said firewall responsive to a firewall controller, the computer program product having a medium with a computer program embodied thereon, the computer program product comprising:
computer program code for receiving a request message from said firewall controller requesting that a pinhole be opened in said firewall;
computer program code for opening a pinhole in said firewall;
computer program code for receiving a request message from said firewall controller requesting that said pinhole be closed in said firewall; and
computer program code for closing said pinhole in said firewall.

26. A computer program product in a firewall, said firewall responsive to a media gateway controller, the computer program product having a medium with a computer program embodied thereon, the computer program product comprising:
computer program code for receiving a request message from said media gateway controller requesting that a pinhole be opened in said firewall;
computer program code for opening a pinhole in said firewall;
computer program code for receiving a request message from said media gateway controller requesting that said pinhole be closed in said firewall; and
computer program code for closing said pinhole in said firewall.

27. A computer system for remotely controlling a firewall from a firewall controller comprising:
a firewall operatively connected to a private computer network and at least one external computer network;
a firewall controller operatively connected to said firewall for remotely instructing said firewall to open and close pinholes in said firewall.

28. The computer system of claim 27 wherein said firewall controller is a media gateway controller acting as a call server in a VoIP telephony network.

29. The computer system of claim 28 wherein said media gateway controller instructs said firewall to open and close pinholes in said firewall such that media gateway endpoints within said private network can communicate with media gateway endpoints outside said private network on a per call basis.

* * * * *